United States Patent [19]
Gibson et al.

[11] Patent Number: 5,826,702
[45] Date of Patent: Oct. 27, 1998

[54] TAKE-UP SYSTEM FOR THE DRIVE BELT OF A LIVE ROLLER CONVEYOR

[75] Inventors: Roger A. Gibson, Cincinnati; James W. Halsey, Forest Park, both of Ohio

[73] Assignee: The Buschman Company, Cincinnati, Ohio

[21] Appl. No.: 682,018

[22] Filed: Jul. 16, 1996

[51] Int. Cl.⁶ .................................................. B65G 13/02
[52] U.S. Cl. .......................................... 198/787; 198/790
[58] Field of Search ..................................... 198/790, 787

[56] References Cited

U.S. PATENT DOCUMENTS

| | | |
|---|---|---|
| 1,975,927 | 10/1934 | Cushman . |
| 2,002,830 | 5/1935 | Pevear . |
| 2,129,510 | 9/1938 | Taylor . |
| 2,487,196 | 11/1949 | Sternad et al. . |
| 2,836,284 | 5/1958 | Gilliatt . |
| 3,353,653 | 11/1967 | Arvidson et al. . |
| 3,534,872 | 10/1970 | Roth et al. ............................. 198/787 |
| 4,096,942 | 6/1978 | Shepherd . |
| 4,117,923 | 10/1978 | Werntz . |
| 4,284,190 | 8/1981 | Greenlee ................................ 198/783 |
| 4,620,628 | 11/1986 | Greenlee . |
| 4,753,339 | 6/1988 | Vogt et al. . |
| 5,007,526 | 4/1991 | Fazzina et al. . |
| 5,244,081 | 9/1993 | Kajii et al. ............................. 198/790 |

Primary Examiner—William E. Terrell
Assistant Examiner—Joe Dillon, Jr.
Attorney, Agent, or Firm—Frost & Jacobs LLP

[57] ABSTRACT

A drive belt take-up system for a live roller conveyor. Live roller conveyors are made up of one or more curved and/or rectilinear segments. Each segment comprises a pair of spaced side frames which support the live rollers. The live rollers carry and transport the articles being conveyed. The live rollers are driven by frictional contact with the upper flight of a continuous drive belt. At one end of the conveyor segment one of the side frames (the one with a smaller radius of curvature in the case of a curved segment) supports a powered sheave which drives the belt. The same side frame supports a plurality of idler wheels therealong and a first idler sheave at its other end, all of which maintain the upper flight of the drive belt in frictional contact with the live rollers. From the first idler sheave the drive belt passes about an adjustable take-up sheave. Thereafter the belt passes about a second idler sheave located near the first idler sheave. The belt then passes about at least one return flight idler wheel (if needed) to a third idler sheave. The third idler sheave is located near the power sheave. From the third idler sheave the belt passes about a second adjustable take-up sheave and returns to the powered sheave. It would be within the scope of the invention to eliminate one of the second and third idler sheaves and the corresponding one of the first and second take-up sheaves.

28 Claims, 11 Drawing Sheets

TAKE-UP SYSTEM FOR THE DRIVE BELT OF A LIVE ROLLER CONVEYOR

TECHNICAL FIELD

The invention relates to a drive belt take-up system for a live roller conveyor, and more particularly to such a system which may be a dual system, which is applicable to both a rectilinear conveyor segment and a curved conveyor segment, and which provides a take-up capacity enabling the use of standard length belts.

BACKGROUND ART

Prior art workers have devised many types of roller conveyors, some having idler rollers, and some having driven rollers. The present invention is directed to conveyors of the type having driven rollers, frequently referred to as live roller conveyors.

While numerous roller drives have been used heretofore, one of the most frequently encountered drives comprises a continuous drive belt, the upper flight of which is maintained in frictional engagement with the conveyor rollers. The drive belt is, itself, driven.

Standard practice requires some sort of drive belt take-up system to assure proper belt tension and to make up for belt stretch and the like. The most prevalent belt take-up system used heretofore was provided in the lower flight of the drive belt and extended transversely of the conveyor so that the amount of belt take-up was limited by the width of the conveyor. Prior art take-up systems of the type just described generally require considerable twisting of the belt and "back-bending" thereof. In other words, when a V-belt is used, the surface of the belt which normally contacts and drives the conveyor rollers would, at some point in the take-up system, be required to pass about an idler wheel under tension. "Back bending" generally reduces belt life.

Belts, such as V-belts, normally come in standard lengths. Frequently, a particular conveyor segment will require a V-belt of a length falling between standard lengths. If the take-up system of the conveyor segment cannot accommodate the extra length of a standard V-belt of the next larger standard size, then a custom V-belt must be used. Custom length belts, however, are generally more expensive than standard length belts.

The present invention is based on the discovery that many of the problems of the prior art take-up systems can be avoided by providing the drive belt with a unique path. The belt path is such that it requires no "back bending" of the belt. The system of the present invention provides the ability to use standard V-belts. In longer length belts, the standard belts make large pitch length differences from one available belt size to the next. The take-up system of the present invention can accommodate large pitch length differences since the take-up is not limited by the width of the conveyor or other space constraints. The mounting of the belt is more compact since the take-up system is mounted adjacent to one of the two side frames of the conveyor. In the preferred embodiment of the present invention, the continuous belt is subject to minimal twisting.

DISCLOSURE OF THE INVENTION

According to the invention there is provided a live roller conveyor drive belt take-up system for live roller conveyors of the type made up of one or more segments. According to the conveyor requirements, the segments used may be rectilinear, curved, or a combination of rectilinear and curved segments. Each segment comprises a pair of spaced side frames which support the live rollers. The live rollers carry and transport the articles being conveyed.

The live rollers are driven by the upper flight of a continuous drive belt which frictionally engages the live rollers from beneath. The drive belt, itself, is driven by a sheave which is driven by a prime mover mounted at one end of one of the segment side frames (the frame with the smaller radius of curvature in the case of a curved segment). The same frame supports a plurality of idler wheels therealong and a first idler sheave at its other end. The idler wheels and idler sheave maintain the upper flight of the drive belt in frictional contact with the live rollers.

From the first idler sheave the drive belt passes about a first adjustable take-up sheave. From the first take-up sheave the drive belt passes about a second idler sheave. The second idler sheave is spaced from and may be substantially coaxial with the first idler sheave. From the second idler sheave, the drive belt passes about at least one return flight idler wheel (if needed) to a third idler sheave spaced from and substantially coaxial with the powered sheave. From the third idler wheel the drive belt passes about a second adjustable take-up sheave substantially identical to the first take-up sheave. Finally, from the second take-up sheave the drive belt returns to and passes about the powered sheave. This path of travel provides a primary loop of the belt about the driven sheave and the first idler sheave together with two secondary loops of the belt in the return flight of the belt. This path of travel requires minimal twisting of the drive belt and no "back-bending" thereof. It is within the scope of the invention to eliminate one of the idler sheaves and one of the take-up sheaves.

DETAILED DESCRIPTION OF THE INVENTION

Figure 1:
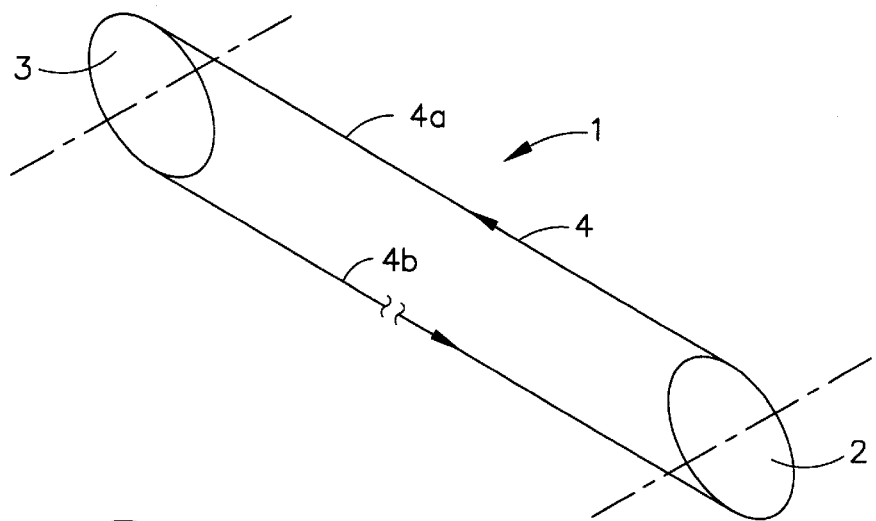
FIG. 1 is a diagrammatic perspective view of the simplest drive belt system for the live rollers of a conveyor, there being no take-up for the belt.

Reference is first made to FIG. 1 which illustrates the simplest drive belt system for the rollers of a conveyor belt. The drive belt system of FIG. 1 is illustrated as being for a rectilinear section of conveyor. Curved conveyors will be illustrated and described hereinafter. The drive belt system of FIG. 1 is generally indicated at 1 and comprises a pair of sheaves 2 and 3 about which a belt 4 passes. Either one of sheaves 2 and 3 may be driven by an appropriate prime mover (not shown) to drive belt 4. In this embodiment, no take-up assembly is provided to adjust the tension of belt 4, to accommodate stretch of belt 4, or to take-up a portion of belt 4, should the belt be longer than is required. Adjustment for belt tension or belt stretch and take-up of excess belt could only be accomplished in the embodiment of FIG. 1 if at least one of the sheaves 2 and 3 was capable of being shifted away from the other. It will be understood that the upper flight 4a of belt 4 will frictionally engage the rollers of the conveyor to cause rotation thereof. The upper flight 4a is maintained against the conveyor rollers by idler wheels (not shown). Idler rollers may also be provided to support the return flight 4b of belt 4, should its length require such support.

Figure 2:
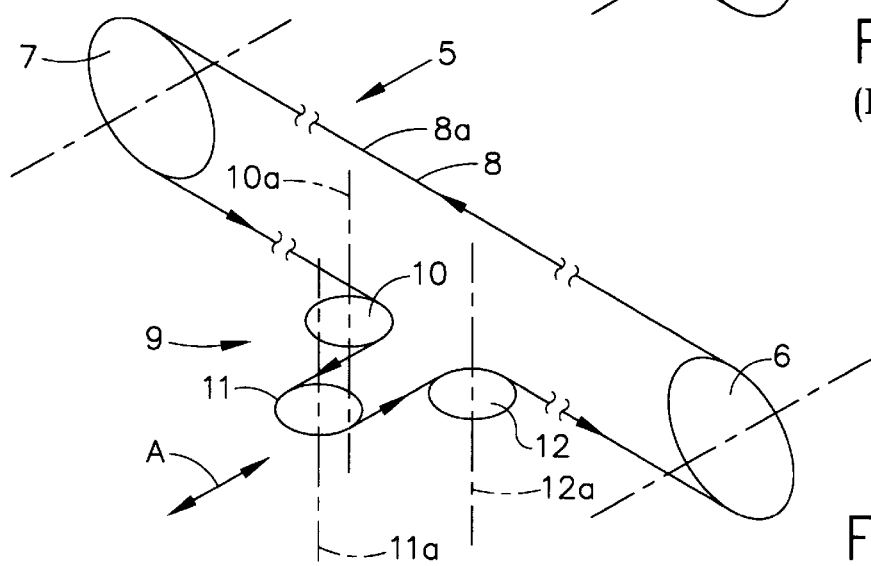
FIG. 2 is a diagrammatic perspective view of the system of FIG. 1 provided with a typical prior art take-up for the belt.

FIG. 2 shows an embodiment similar to that of FIG. 1, but provided with take-up means for the belt. The drive belt system of FIG. 2 is generally indicated at 5 and comprises a pair of sheaves 6 and 7 about which the belt 8 passes. Again, either sheave 6 or 7 could be driven to drive the belt 8, the upper flight 8a of which will be held against the conveyor rollers (not shown) by idler rollers (not shown), as is well known in the art. The belt adjustment and take-up assembly of the embodiment of FIG. 2 is generally indicated at 9 and comprises three horizontally oriented sheaves 10, 11 and 12. When the belt 8 is non-circular cross-section (such a V-belt or the like), the belt will be required to make a 90 degree twist between vertical sheave 7 and horizontal sheave 10. From sheave 10, the belt passes about sheaves 11 and 12. Between sheaves 12 and 6, the belt will be required to make a return 90 degree twist, if the belt is of non-circular cross-section. The axis 11a of sheave 11 is shiftable transversely of the conveyor in the directions of double ended arrow A. By shifting the axis 11a of sheave 11, the tension of belt 8 may be adjusted, any stretch of belt 8 may be accommodated, along with any excess length of belt 8.

A typical problem with this type of prior art take-up lies in the fact that it extends transversely of the conveyor in between the conveyor side frames and therefor, the distance by which the axis 11a of sheave 11 may be shifted is limited by the width of the conveyor. Furthermore, when belt 8 is of non-circular cross-section, as for example a V-belt, the surface normally used to drive the conveyor rollers is engaged by sheave 11. This is a condition known as back-bending the belt and tends to reduce belt life. It will be understood that any of the sheaves 6, 7, 10, 11 or 12 could be driven to drive belt 8. Normally, one of the sheaves 6 and 7 would be the driven sheave.

Figure 3:
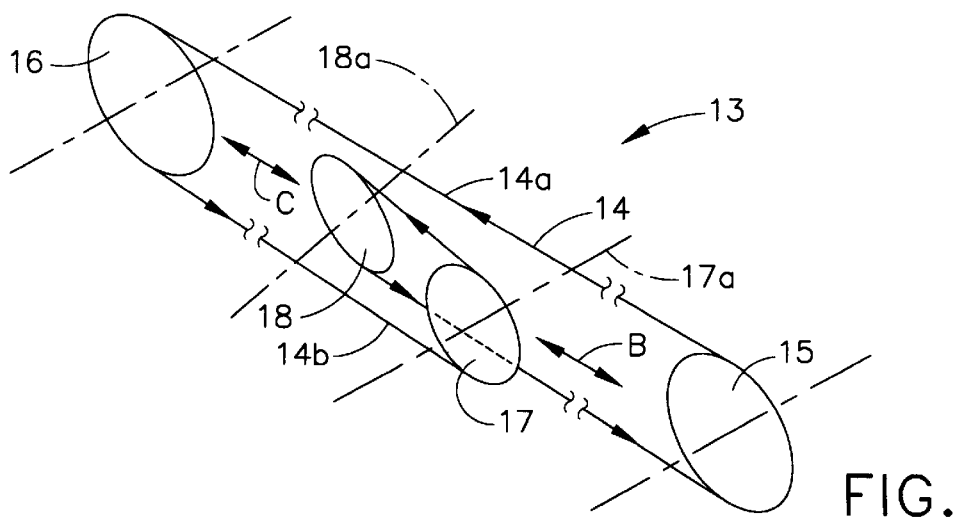
FIG. 3 is a diagrammatic perspective view of a drive belt system according to the present invention having a closed take-up loop for the belt.

FIG. 3 illustrates the simplest form of a drive belt system according to the present invention. The system is generally indicated at 13 and comprises a belt 14 which passes about vertically oriented sheaves 15 and 16.

The belt 14 has an upper flight 14a to drive the rollers of a conveyor in the manner described with respect to FIGS. 1 and 2. The belt 14 has a lower or return flight 14b. The drive belt system 13 of FIG. 3 includes an additional pair of sheaves 17 and 18. The belt 14 passes from sheave 15 to sheave 16; from sheave 16 to sheave 17; from sheave 17 to sheave 18; and from sheave 18 back to sheave 15. This arrangement creates a belt path comprising a primary loop about sheaves 15 and 16 and a secondary loop about sheaves 17 and 18 formed in the return flight of the primary loop. It will be understood by one skilled in the art that if the axis 17a of sheave 17 were shiftable in the directions of arrow B, sheave 17 could not only be used to adjust the tension of the belt and to accommodate belt stretch, but also could serve as a take-up means for extra belt length. This would also be true of sheave 18, if its axis 18a were shiftable in the direction of arrow C. In fact, both axes 17a and 18a of sheaves 17 and 18, respectively, could be shiftable in the directions of their respective arrows B and C, providing a considerable amount of belt take-up. Sheave 18 and its axis 18a may be slightly tilted to make the belt shift from sheave 17 to sheave 15 easier. It will be understood that any one of sheaves 15, 16, 17 or 18 could be driven.

Figure 4:
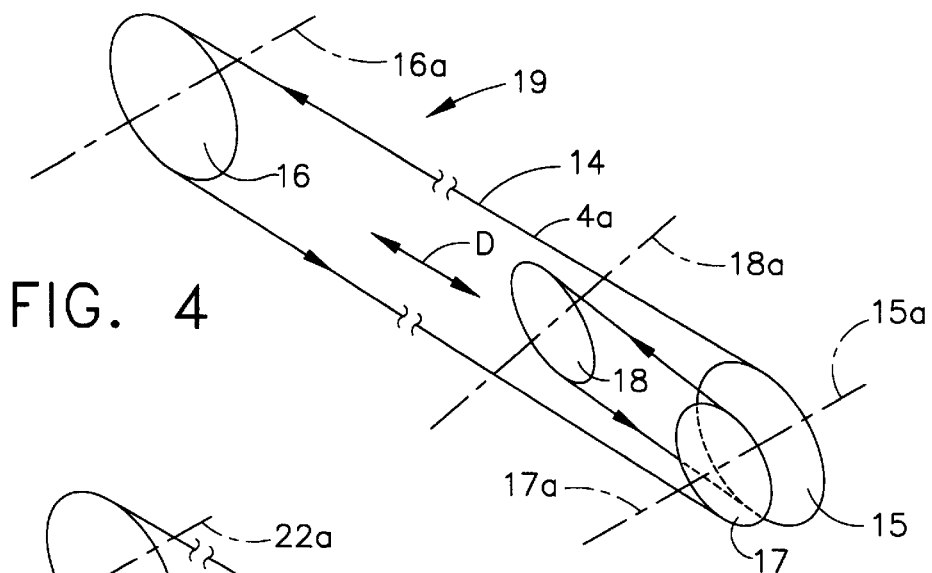
FIG. 4 is a diagrammatic perspective view of the drive belt system of FIG. 3 with the take-up loop moved toward one end of the drive belt system.

Reference is now made to FIG. 4. The drive belt system of FIG. 4 is generally indicated at 19. The drive belt system 19 is substantially identical to the drive belt system 13 of FIG. 3 such that like parts have been given like index numerals. The difference between drive belt systems 19 and 13 lies in the fact that the sheaves 17 and 18 have been moved to one end of the system 19. The belt drive system 19 is somewhat simpler and more compact than the belt drive system 13. In this instance, the secondary loop of sheaves 17 and 18 has been moved to one end of the primary loop of sheaves 15 and 16. The axis 17a of sheave 17 is moved closer to the axis 15a of sheave 15. In the particular embodiment of FIG. 4, these axes are shown to be coaxial. These sheaves need not be coaxial, if desired. In this arrangement, the axis 17a of sheave 17 is fixed and the axis 18a of sheave 18 is shiftable in the directions of arrow D. It will be immediately apparent that unlike the drive belt system 5 of FIG. 2, the take-up capability of the drive belt system 19 is not limited by the width of the conveyor system, but rather by its length. Again sheave 18 and its axis 18a are shown slightly tilted to ease the belt transition between sheaves 17 and 15.

It will be evident to one skilled in the art that the drive belt systems 13 of FIG. 3 and 19 of FIG. 4 impart a 360 degree twist to belt 14. This does not pose a problem, if belt 14 is of circular cross-section. If belt 14 is of non-circular cross-section (such as a V-belt, for example) this still would not pose a problem so long as the twist is imparted to the belt over a considerable length. Alternatively, a belt of non-circular cross-section could be used which has a 360 degree twist formed in the belt during manufacture thereof. Again it will be understood that any one of sheaves 15, 16, 17 and 18 could be the driven sheave. Preferably one of sheaves 15 and 16 constitutes the driven sheave.

Figure 5:
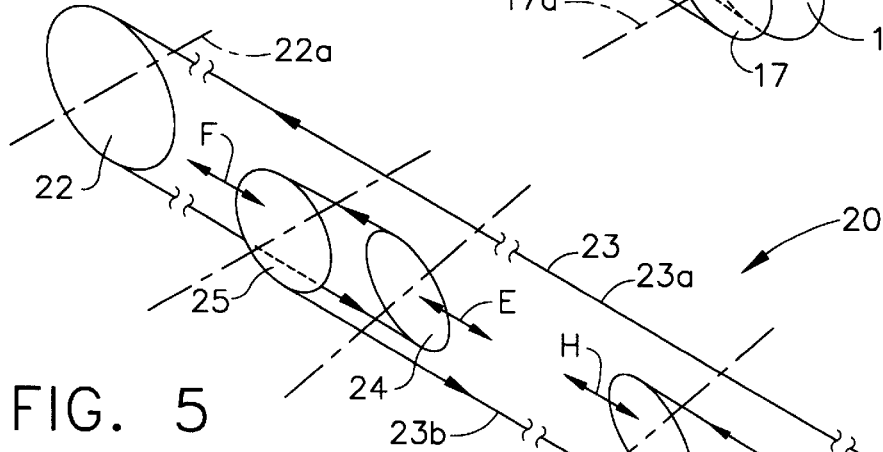
FIG. 5 is a diagrammatic perspective view of a drive belt system of the present invention having two closed take-up loops for the belt.

Reference is now made to FIG. 5. FIG. 5 shows a drive belt system, generally indicated at 20, comprising a pair of sheaves 21 and 22 about which a belt 23 passes. Belt 23 has an upper flight 23a intended to drive the rollers of a conveyor. Belt 23 has a lower flight 23b.

The drive belt system 20 of FIG. 5 further comprises a pair of sheaves 24 and 25. It will be appreciated that the sheaves 24 and 25 form a secondary loop in return flight 23b of belt 23. The drive belt system 20 of FIG. 5 also comprises an additional pair of sheaves 26 and 27 which also form a secondary loop in return flight 23b of belt 23. The belt path may be described as follows, belt 23 passes from sheave 21 to sheave 22. Thereafter, belt 23 passes from sheave 22 to sheave 24 and from sheave 24 to sheave 25 forming the first loop in return flight 23b of belt 23. From sheave 25, belt 23 passes to and about sheave 26. From sheave 26 the belt passes to and about sheave 27, returning to sheave 21 and forming another secondary loop in return flight 23b of belt 23. As a result of this, the belt path comprises a primary loop between sheaves 21 and 22, having in its lower flight 23b two secondary loops, one formed by sheaves 24 and 25 and the other formed by sheaves 26 and 27.

In this drive belt system 20 the axis 24a of sheave 24 may be shiftable in the directions of arrow E, or the axis 25a of sheave 25 may be shiftable in the directions of arrow F, or both, to provide proper tension to belt 23, to take up stretch thereof and to take up extra length. Similarly, the axis 26a of sheave 26 could be shiftable in the directions of arrow G, or the axis 27a of sheave 27 could be shiftable in the directions of arrow H, or both, so that sheaves 26 and 27 could also serve as belt adjustment and belt take-up devices. Again, it will be apparent from FIG. 5 that take up in the drive belt system 20 is limited by the length of the conveyor, rather than by its width. In addition, there is no back bending of the belt. The secondary loop about sheaves 24 and 25 imparts a 360° twist in drive belt 23. The secondary loop about sheaves 26 and 27 also imparts a 360° twist in drive belt 23, but in the opposite direction, effectively removing the twist imparted by the secondary loop about sheaves 24 and 25. It will be noted that the axes 27a of sheave 27 and 24a of sheave 24 are slightly tilted to provide an easy transition for the belt from sheave 22 to sheave 25 and from sheave 26 to sheave 21. Again, any one of sheaves 21, 22, 24, 25, 26 or 27 can be the driven sheave. Preferably one of sheaves 21 and 22 is the driven sheave.

Figure 6:
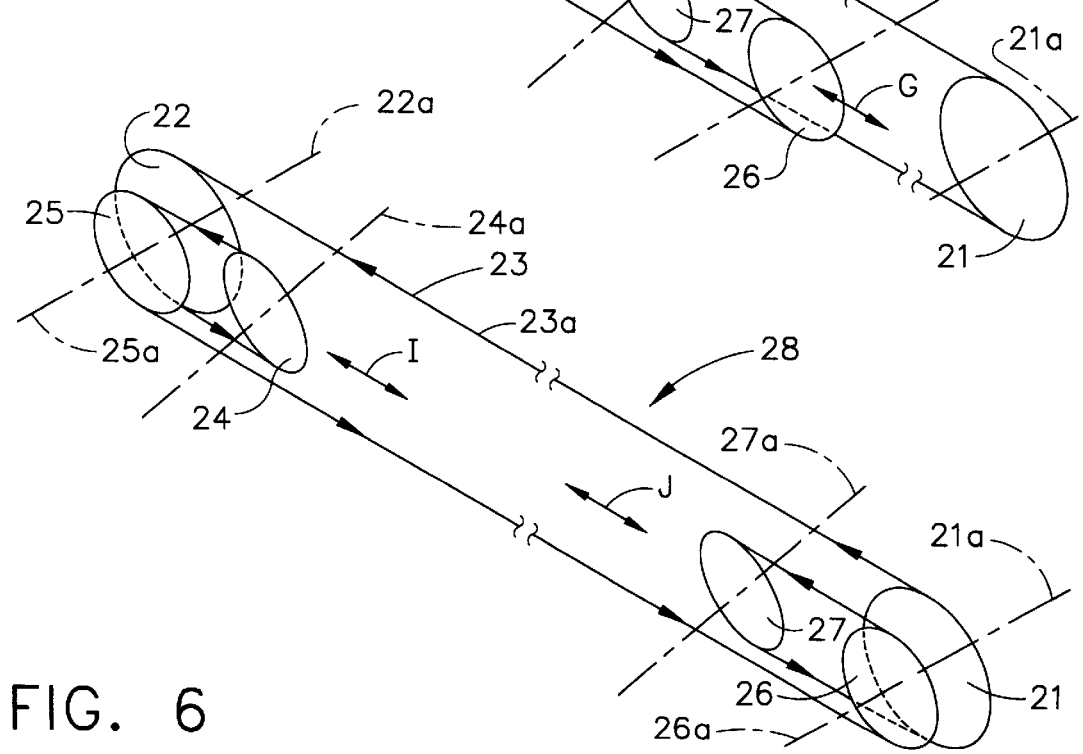
FIG. 6 is a diagrammatic perspective view of the drive belt system of FIG. 5 with each take-up loop moved toward its respective end of the drive belt system.

Reference is now made to FIG. 6. The drive belt system of FIG. 6 is generally indicated at 28. FIG. 6 is a modification of the embodiment of FIG. 5 in much the same way that FIG. 4 is a modification of the embodiment of FIG. 3. As a consequence, the parts in FIG. 6 are given the same index numerals as the parts of FIG. 5. In the drive belt system 28 of FIG. 6, sheaves 24 and 25 have been shifted toward the adjacent end of the system. The axes 22a of sheave 22 and 25a of sheave 25 may be relatively close together and, for purposes of this showing, are illustrated as being coaxial. The axis 25a of sheave 25 is fixed and the axis 24a of sheave 24 is shiftable in the directions of arrow I. In a similar fashion, the axis 26a of sheave 26 is moved near the axis 21a of sheave 21, and again for purposes of an exemplary showing, are illustrated as being coaxial. The axis 26a of sheave 26 is fixed and the axis 27a of sheave 27 is shiftable in the directions of arrow J.

The embodiments of the present invention illustrated in FIGS. 3, 4, 5 and 6 are characterized by a number of important features. First of all, the take-up ability of these embodiments is greatly increased over that of the prior art. All of the sheaves of all of the embodiments of FIGS. 3–6 can be mounted from one side frame of the conveyor and therefore are relatively compact from a transverse standpoint. None of the embodiments of FIGS. 3–6 require back bending of the belt.

The embodiment of FIG. 6 is the preferred embodiment of the present invention because it not only has all of the aforementioned advantages, but also it imparts minimal twist to the belt 23 since the two secondary loops essentially cancel each other from the standpoint of imparted twist. It will be noted that the axes 24a of sheave 24 and 27a of sheave 27 are slightly tilted to ease the belt transition between sheave 22 and sheave 25 and between sheave 26 and sheave 21.

FIGS. 7–11 illustrate a specific application of the preferred embodiment of FIG. 6. In FIGS. 7–11, like parts have been given like index numerals.

Figure 7:
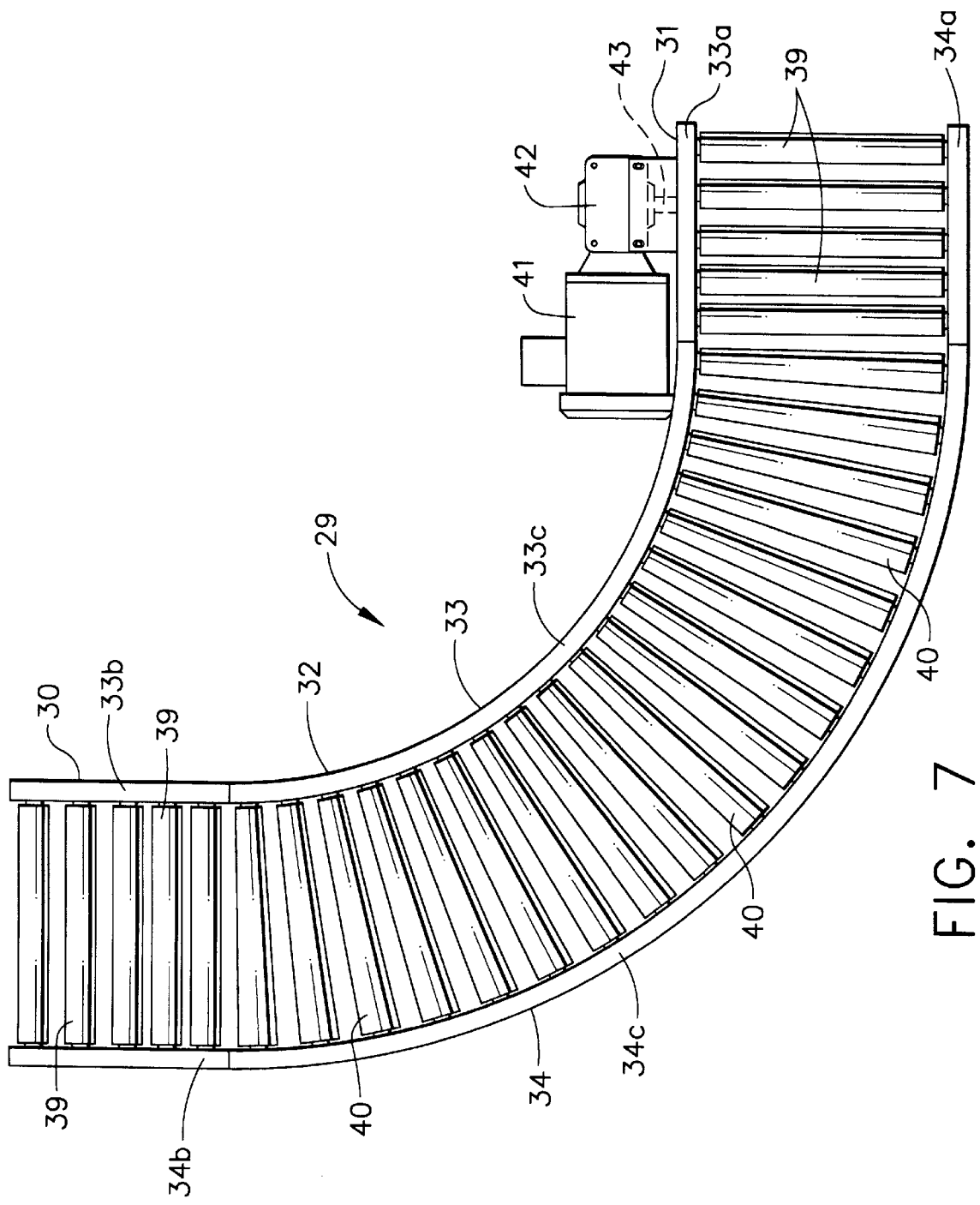
FIG. 7 is a plan view of a segment of a live roller conveyor incorporating a curved portion.

Reference is first made to FIG. 7, wherein the conveyor segment is generally indicated by index numeral 29. For purposes of an exemplary showing, the invention will be described in its application to a conveyor segment incorporating a curved section. The take-up system of the present invention, when applied to a rectilinear segment, differs only in a few details, which will be pointed out hereinafter.

Figure 8:
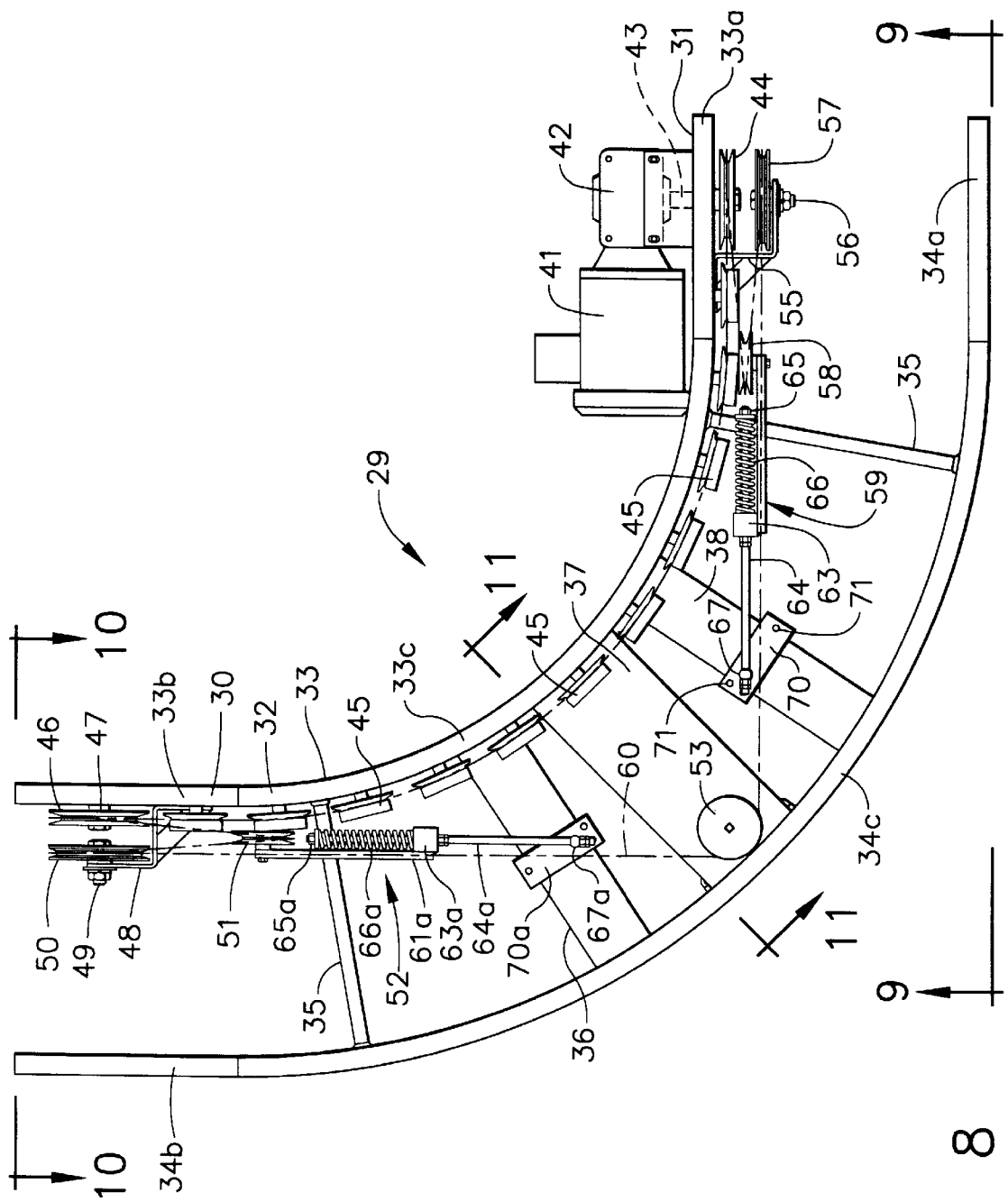
FIG. 8 is a similar plan view with the live rollers of the conveyor removed to reveal the path of travel of the drive belt and the overall take-up system of the present invention.

The conveyor segment 29 has a first rectilinear end portion 30 and a second rectilinear end portion 31 with a curved portion 32 therebetween. Segment 29 comprises a first side frame 33 and a second side frame 34. The first side frame 33 is made up of a first rectilinear end portion 33a, a second rectilinear end portion 33b, and a intermediate curved portion 33c, all of which are joined together end-to-end by means well known in the art and not shown in FIG. 7. In a similar fashion, side frame 34 is made up of a first rectilinear portion 34a, a second rectilinear end portion 34b, and an intermediate curved portion 34c, again joined together end-to-end. It will be noted that end portions 33a and 34a and end portions 33b and 34b of side frames 33 and 34 are in parallel spaced relationship, and the spacing continues between curved portions 33c and 34c. The spacing of side frames 33 and 34 is maintained by spacer bars and various support panels. Several spacer bars are shown in FIG. 8 at 35. The use of spacer bars is conventional and their number and location will depend upon the size, length and other structural features of the conveyor segment 29, as is well known in the art. Various support panels also provide additional connection between side frames 33 and 34. In FIG. 8, three support panels are shown at 36, 37 and 38.

Returning to FIG. 7 it will be noted that the end portions 30 and 31 of segment 29 are provided with cylindrical conveying rollers 39. The curved portion 32 of segment 29 is provided with tapered conveyor rollers 40 so as to turn the conveyed product around the conveyor curve. A typical cylindrical roll 39 is illustrated in phantom in FIG. 10. The roller 39 is mounted on a shaft which extends through or between side frames 33 and 34. The roller 39 is provided with appropriate bearings, as is well known in the art, so as to be free-wheeling on its shaft.

Figure 11:
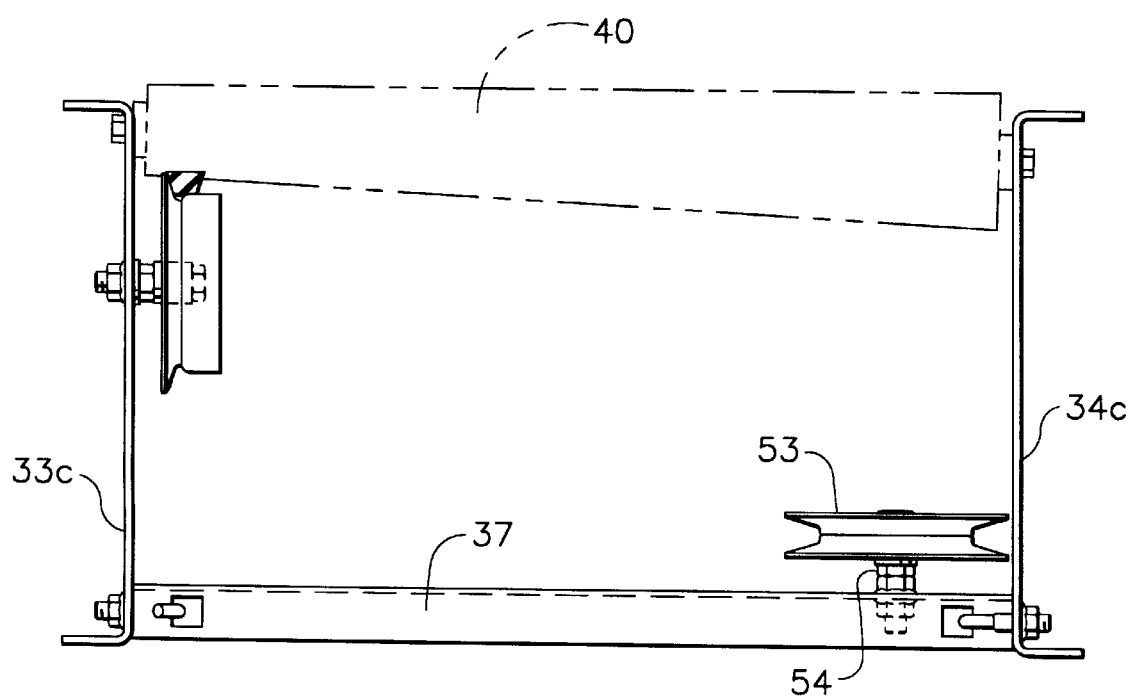
FIG. 11 is a cross-sectional view taken along section line 11—11 of FIG. 8 with an adjacent conveyor roller illustrated in phantom lines.

FIG. 11 illustrates the mounting of a typical tapered roller 40. The roller 40 is mounted on a shaft supported by side frame portions 33c and 34c. Again, the roller 40 is provided with appropriate bearings, as is well known in the art, so as to be free wheeling with respect to its shaft. It is to be noted that tapered conveyor roller 40 is so mounted that its surface portion contacted by articles being conveyed is horizontal.

The rollers 39 and 40 are driven and are therefore frequently referred to as "live rollers". As will be apparent hereinafter, the rollers 39 and 40 are driven by a continuous drive belt which is maintained in frictional contact with the rollers.

Reference is made to FIG. 8. Near the free end of side frame portion 33a of conveyor segment 29 a prime mover 41 (in the form of an electric motor and a gear box 42) is mounted adjacent the exterior surface of side frame portion 33a. The output shaft 43 of gear box 42 passes through side frame segment 33a and supports at its end a powered sheave 44 which is non-rotatively affixed thereto. The side frame segments 33a, 33b and 33c support a plurality of substantially evenly spaced short shaft assemblies each having an idler wheel 45 mounted thereon adjacent the inside surface of side frame 33.

Near the end of portion 33b of side frame 33, a first idler sheave 46 is rotatively mounted on a short shaft assembly 47 affixed to side frame portion 33b.

A bracket 48 is affixed to portion 33b and mounts a short shaft assembly 49 upon which a second idler sheave 50 is rotatively mounted. Idler sheave 50 is substantially identical to idler sheave 46 and is substantially parallel thereto.

On that side of sheaves 46 and 50, facing away from the adjacent end of conveyor portion 33b of conveyor section 30, there is a take-up sheave 51. As is apparent from FIG. 8, take-up sheave 51 is located behind and between idler sheaves 46 and 50 and is angled slightly with respect thereto. The purpose for this will be apparent hereinafter. Take-up sheave 51 has a mounting assembly generally indicated at 52 which will be discussed hereinafter. Behind take-up sheave 51, there is a return idler wheel 53. As is clearly shown in FIG. 11, idler wheel 53 is rotatively mounted on a short shaft assembly 54 affixed to the channel shape support panel 37, mounted on and extending between portion 33c and portion 34c of frames 33 and 34, respectively.

A bracket 55 (FIG. 8), similar to bracket 48, is mounted on the inside surface of frame portion 33a and supports a short shaft assembly 56 upon which a third idler sheave 57 is rotatively mounted. Idler sheave 57 is substantially identical to powered sheave 44. The bracket 55 is such that the third idler sheave 57 is substantially parallel to powered sheave 44. Spaced from sheaves 44 and 57 and on that side thereof opposite the end of conveyor segment portion 33a there is a take-up sheave 58, substantially identical to take-up sheave 51. The take-up sheave 58 has a mounting assembly generally indicated at 59, which will be described hereinafter.

Figure 9:
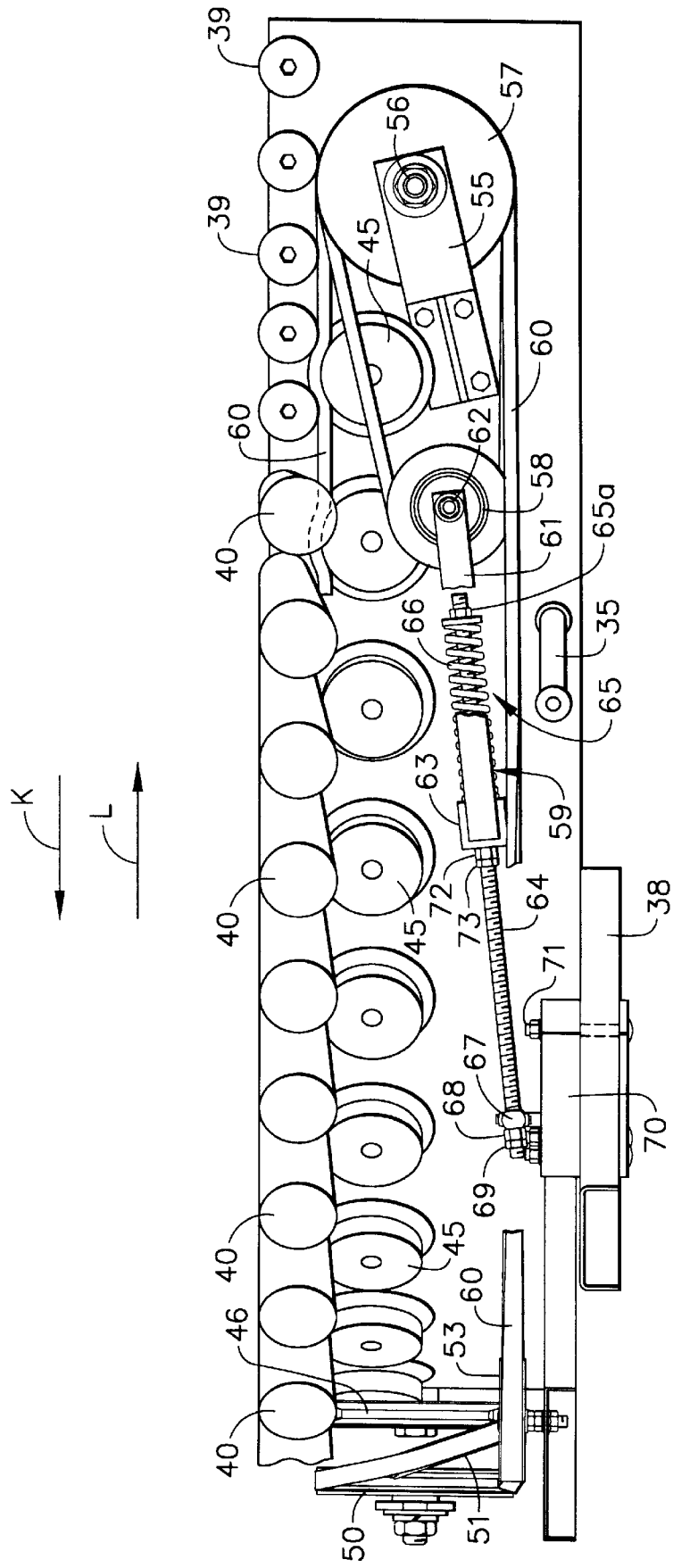
FIG. 9 is an elevational view taken along line 9—9 of FIG. 8 with the large curvature frame removed.
Figure 10:
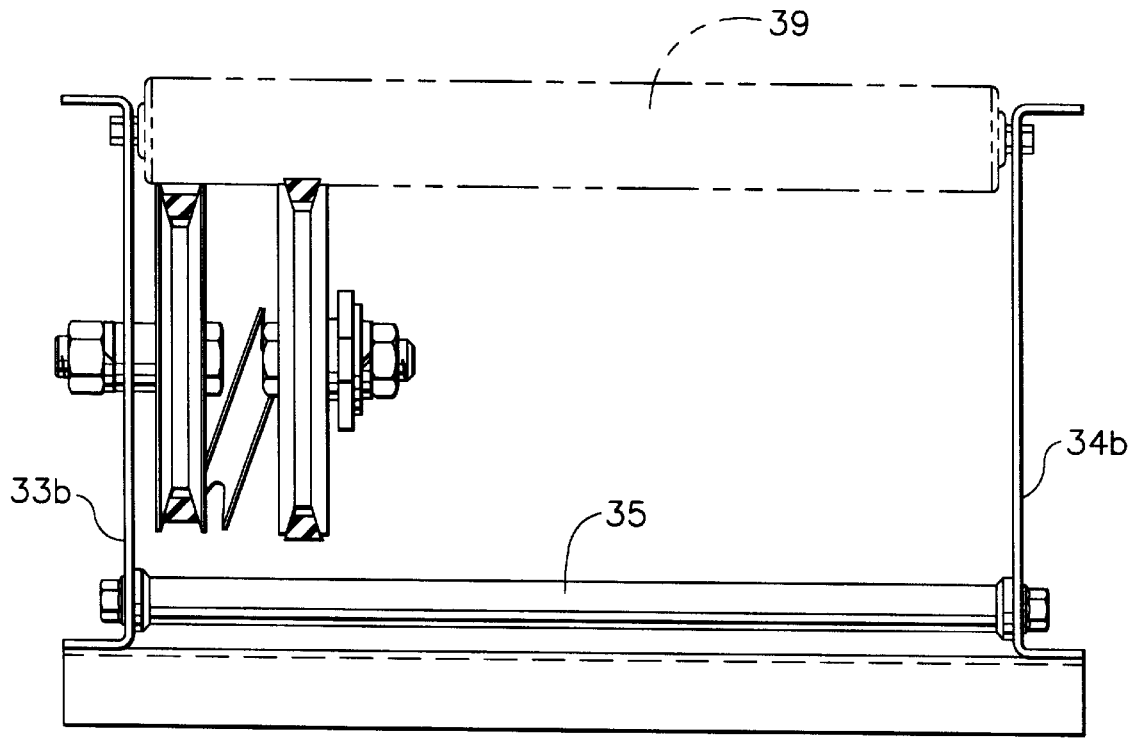
FIG. 10 is an end view as seen from line 10—10 of FIG. 8 with the adjacent conveyor roller illustrated in phantom lines.

Reference is now made to FIGS. 8 and 9. In FIG. 8, the drive belt 60 of the present invention is illustrated in broken lines. In FIG. 9, the drive belt 60 is fragmentarily shown in solid lines. In FIG. 9, the support assembly 52 of take-up sheave 51 has been eliminated for purposes of clarity. Furthermore, it is to be noted in FIG. 9 that powered sheave 44 is located behind the adjacent third idler sheave 57.

For a number of reasons such as availability, quiet running and the like, it is preferred that drive belt 60 be a V-belt. It will be understood, however, that belts of other cross-sectional configurations such a circular, oval or the like could be used for this purpose. Since V-belts are most commonly used, the invention will be described in terms of drive belt 60 constituting a V-belt. For this reason, drive sheave 44, first, second and third idler sheaves 46, 50 and 57, take-up sheaves 51 and 58, and return sheave or wheel 53 are all provided with a V-shaped notch about their peripheral edges. As is shown in FIGS. 8, 9 and 11, idler wheels 45 are preferably provided with a peripheral edge having a single flange. Drive belt 60 will be urged both against the peripheral edges of idler wheels 45 and their single flanges by the conveyor rollers and the arcuate path of travel of the upper flight of drive belt 60. The use of such a single flange makes it easier for the upper flight of drive belt 60 to follow a curved path.

Drive belt 60 passes about powered sheave 44 and its upper flight passes along idler wheels 45 and beneath conveyor rollers 39 and 40. It will be noted that the idler wheels 45 are each located between a pair of rollers 39 or 40 and are so positioned that they cause the upper flight of drive belt 60 to fictionally engage the conveyor rollers 39 and 40.

From the idler wheels 45, the drive belt passes about first idler sheave 46, take-up sheave 51, and second idler sheave 50. From second idler sheave 50, the lower flight of the belt passes about return sheave or wheel 53 to third idler sheave 57. From third idler sheave 57 the drive belt 60 passes about take-up sheave 58 and back to power sheave 44, completing the path of travel of the drive belt 60.

It will be noted from FIGS. 8, 9 and 11 that return wheel 53 is horizontally mounted so that it can cause the lower flight of drive belt 60 to make a horizontal turn between second idler sheave 50 and third idler sheave 57. To accomplish this, that part of the lower flight of drive belt 60 must have a 90 degree twist between essentially vertical second idler sheave 50 and horizontal return wheel 53. Since this is a relatively long distance, such a 90 degree twist can readily be made by the drive belt. From the return wheel 53 to the third idler sheave 57, the lower flight makes another 90 degree twist to return to its original condition.

Reference is now made to FIGS. 8 and 9. The support assembly 59 of the take-up sheave 58 comprises an elongated bar 61 supporting at one end a short shaft assembly 62 on which take-up sheave 58 is rotatively mounted. At its other end, a metallic block 63 is affixed to bar 61. The block 63 has a bore therethrough, the axis of which is parallel to and co-planar with the long axis of bar 61. An elongated, threaded rod 64 passes through the bore in block 63 with clearance and has at its end adjacent take-up sheave 58 a washer 65 and a nut 65a (see FIG. 8). Threaded rod 64 passes through a compression spring 66. One end of compression spring 66 abuts block 63, while the other end of compression spring 66 abuts the washer 65.

That end of threaded rod 64 opposite the end provided with nut 65a and washer 65 passes through a conventional spherical rod end 67 and is provided with a nut 68 and a lock nut 69. Spherical rod end 67 is affixed to a block 70 which, in turn, is affixed to support 38 by bolts 71. The channel shaped support 38 extends between and is affixed to side frames 33 and 34.

The take-up sheave 58 and its support assembly 59 operate in the following manner. Since the threaded rod 64 passes through block 63 with clearance, the bar 61 and take-up sheave 58 can shift along rod 64 to adjust the spring loading. The compression spring 66 tends to urge block 63, bar 61 and take-up sheave 58 in a direction toward the spherical rod end 67. The compression spring 66 is pre-loaded by turning adjustment nut 72 and lock nut 73. The desired tension on drive belt 60 is set by tightening adjustment nut 68. When this occurs, pre-load adjustment nut 72 will become spaced from block 63. Pre-load adjustment nut 72 can also serve as a visual indication of drive belt stretch. When block 63 approaches nut 72 the drive belt 60 is at its minimum allowable tension and it is time to re-tension the drive belt 60.

Since the threaded rod 64 passes through the bore in block 63 with clearance, the block 63, the bar 61 and the sheave 58 are therefore essentially rotatable about rod 64. This enables the take-up sheave 58 to automatically assume a slightly tilted position with respect to third idler sheave 57 and powered sheave 44 so as to minimize twisting of drive belt 60 as it passes between the sheaves 57 and 44 via take-up sheave 58. The same will, of course, be true of the take-up sheave 51 and the tilted position of sheave 51 is clearly illustrated in FIGS. 9 and 10.

The support assembly 52 for take-up sheave 51 is substantially identical to the support assembly 59 of take-up sheave 58. As a result, like parts have been given like index numerals followed by "a".

From the above description, it will be immediately apparent that the take-up capacity of the take-up system of the present invention is greatly increased over the typical prior art take-up assembly. This is not only true because there are two take-up sheaves, but also because each take-up sheave and its associated support assembly are not oriented transversely of conveyor segment 29 and therefore are not limited directly by the width of the conveyor. Thus arrangements such as those shown in FIGS. 3 and 4 would also have increased take-up capability even though only one take-up sheave is shown in FIG. 4. It will be evident that the assembly of the present invention requires no back-bending of drive belt 60 and entails only minimal twisting thereof, the twisting being accomplished over considerable distances. This is particularly true of the embodiments of FIGS. 5 and 6. The increase of take-up capacity enables much broader use of belts of standard size to avoid the requirement of custom length V-belts.

In view of the unique path of travel of drive belt 60, it will be apparent from FIG. 9 that if powered sheave 44 rotates in a clockwise direction, so will all of support wheels 45, first, second and third idler sheaves 46, 50 and 57, take-up sheaves 51 and 58, and return sheave or wheel 53. All of the conveyor rollers 39 and 40 will rotate in a counter-clockwise direction, so that articles being conveyed by the conveyor segment 29 will shift therealong in the direction of arrow "K". If the direction of rotation of driven sheave 44 is counter-clockwise, all of support wheels 45, first, second and third idler sheaves 46, 50 and 57, take-up sheaves 51 and 58 and return sheave or wheel 53 would also rotate in a counter-clockwise direction. Conveyor rollers 39 and 40 would be caused to rotate in a clockwise direction as viewed in FIG. 9 causing articles carried thereby to shift along the conveyor in the direction of arrow "L".

As indicated above, the teachings of the present invention are equally applicable to a conveyor segment which is rectilinear. In such an instance, only a few changes would be required. If the drive belt is a V-belt, the idler wheels 45 would preferably have a V-notch in their peripheral surfaces. The mounting positions of take-up support assembly rods 64 and 64a would shift on their respective mounts 70 and 70a closer to the wall on which drive sheave 44, the idler wheels 45, and the first, second and third idler sheaves 46, 50 and 57 are mounted. Depending upon the length of the conveyor, the return flight of drive belt 60 may be provided with one or more supporting rollers or wheels.

Figure 12:
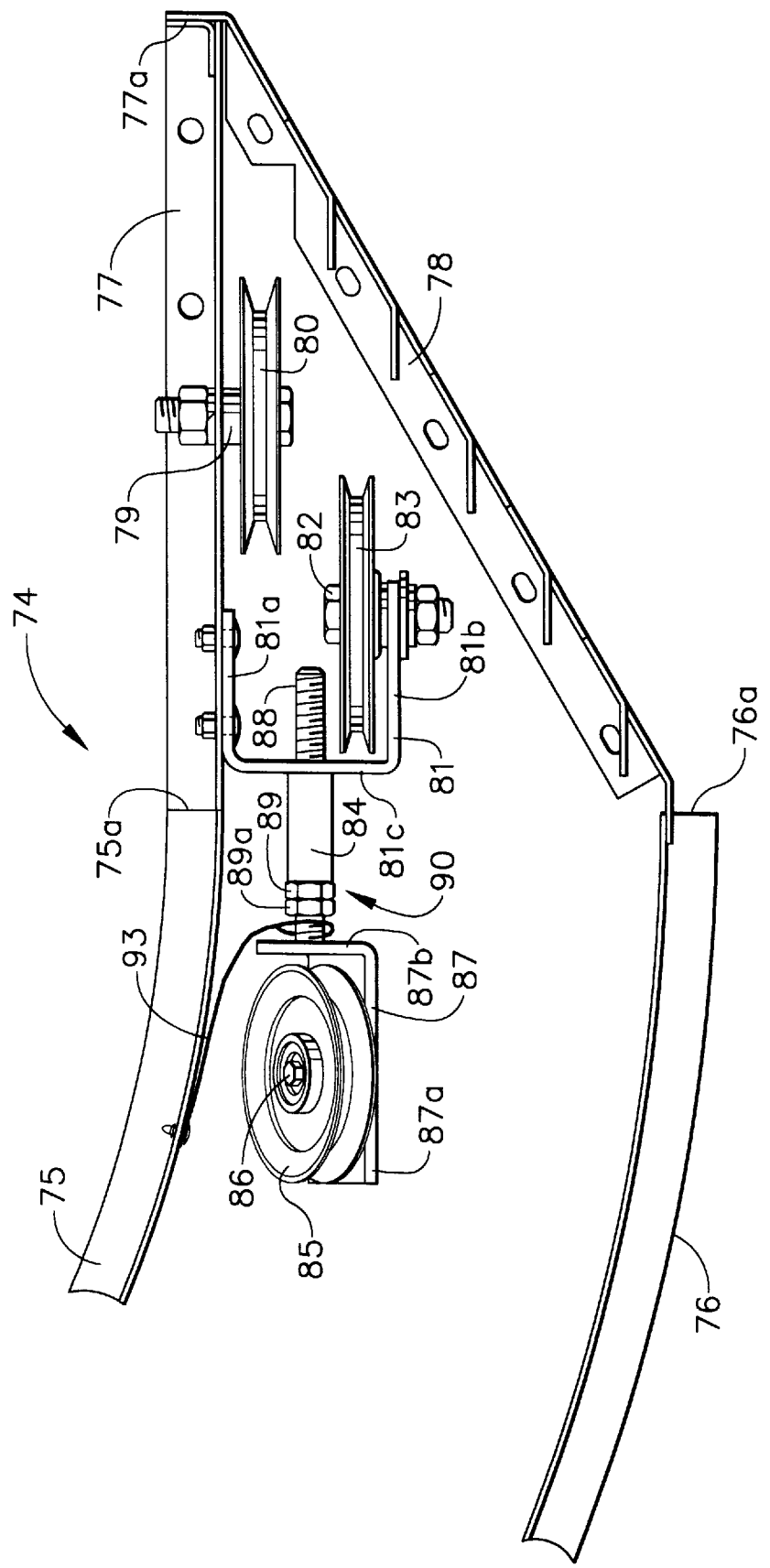
FIG. 12–15 are fragmentary plan views illustrating various mounting brackets for the sheaves, including a take-up sheave.

FIG. 12 fragmentarily illustrates the idler end of a curved branch conveyor segment generally indicated at 74. At the idler end, the curved inner and outer frame members 75 and 76 terminate at 75a and 76a. The inner curved frame member has attached to end 75a a rectilinear frame element 77. The free end 77a of frame element 77 is attached to the end 76a of the curved outer frame member 76 by a frame member 78. As will be understood by one skilled in the art, the frame member 78 is intended to be affixed to the side frame of the main conveyor (not shown) onto which or from which the branch conveyor 74 is intended to convey products.

Affixed to rectilinear frame member 77 there is a short shaft 79 having an idler sheave 80 rotatively mounted thereon with appropriate bearings (not shown). A U-shaped bracket 81 is comprised of legs 81a and 81b and a base portion 81c. The bracket leg 81a is affixed to rectilinear frame element 77 by bolts, as shown. A short shaft 82 is affixed to bracket leg 81b and an idler sheave 83 is rotatively mounted thereon, with suitable bearings (not shown). Affixed to the base 81c of bracket 80, by welding or the like, there is a hollow tubular member 84. The bracket base 81c has a hole therein coaxial with and having the same diameter as the bore of tubular member 84.

A take-up sheave 85 is rotatively mounted with appropriate bearings on a short shaft 86. The short shaft 86 is, itself, mounted on the long leg 87a of an L-shaped bracket 87. Affixed to the short leg 87b of bracket 87, as by welding or the like, is a threaded rod 88. Threadedly engaged on rod 88 there is an adjustment nut 89 and a lock nut 89a.

As in the embodiment of FIG. 8, it will be understood that at the other end of curved branch conveyor segment 74 there will be a driven sheave attached to the adjacent frame element and positioned somewhat similar to idler sheave 80 of FIG. 12. There will be a second idler sheave equivalent to idler sheave 83 and there will be a second take-up sheave equivalent to take-up sheave 85. Between idler sheave 83 and its equivalent at the other end of the curved branch conveyor segment there may be one or more return wheels, similar to return wheel 53 of FIG. 8. It will be understood that idler sheave 80 could be the driven sheave, and its counterpart at the other end of the curved branch conveyor segment could be an idler sheave.

To install and adjust the drive belt, the take-up sheave 85 is set at its minimum take-up position. In other words, the lock nut 89a and adjustment nut 89 are located adjacent the short leg 87b of bracket 87. The drive belt (not shown) is wrapped about idler sheave 80 and from the bottom of idler sheave 80 it is directed to the bottom of take-up sheave 85. It is thereafter wrapped about take-up sheave 85 and from the top thereof is directed to the top of idler sheave 83. From idler sheave 83 it is thereafter directed to one or more return wheels similar to return wheel 53 of FIG. 8 (if required). It will be understood that the idler sheave, the take-up sheave and the drive sheave at the other end of the curved branch conveyor segment will be similarly wrapped. In fact, the wrapping of the drive belt is essentially identical to that taught with respect to the embodiment of FIGS. 8 and 9. The take-up sheave 85 and its counterpart at the other end of conveyor segment 74 are adjusted independently by turning their respective adjustment nuts until the drive belt is properly tensioned. When proper tension of the drive belt is achieved, the lock nut 89a will be abutted against adjustment nut 89 to maintain adjustment nut 89 in position. The same procedure will be followed with respect to the take-up sheave at the other end of conveyor segment 74.

Figure 16:
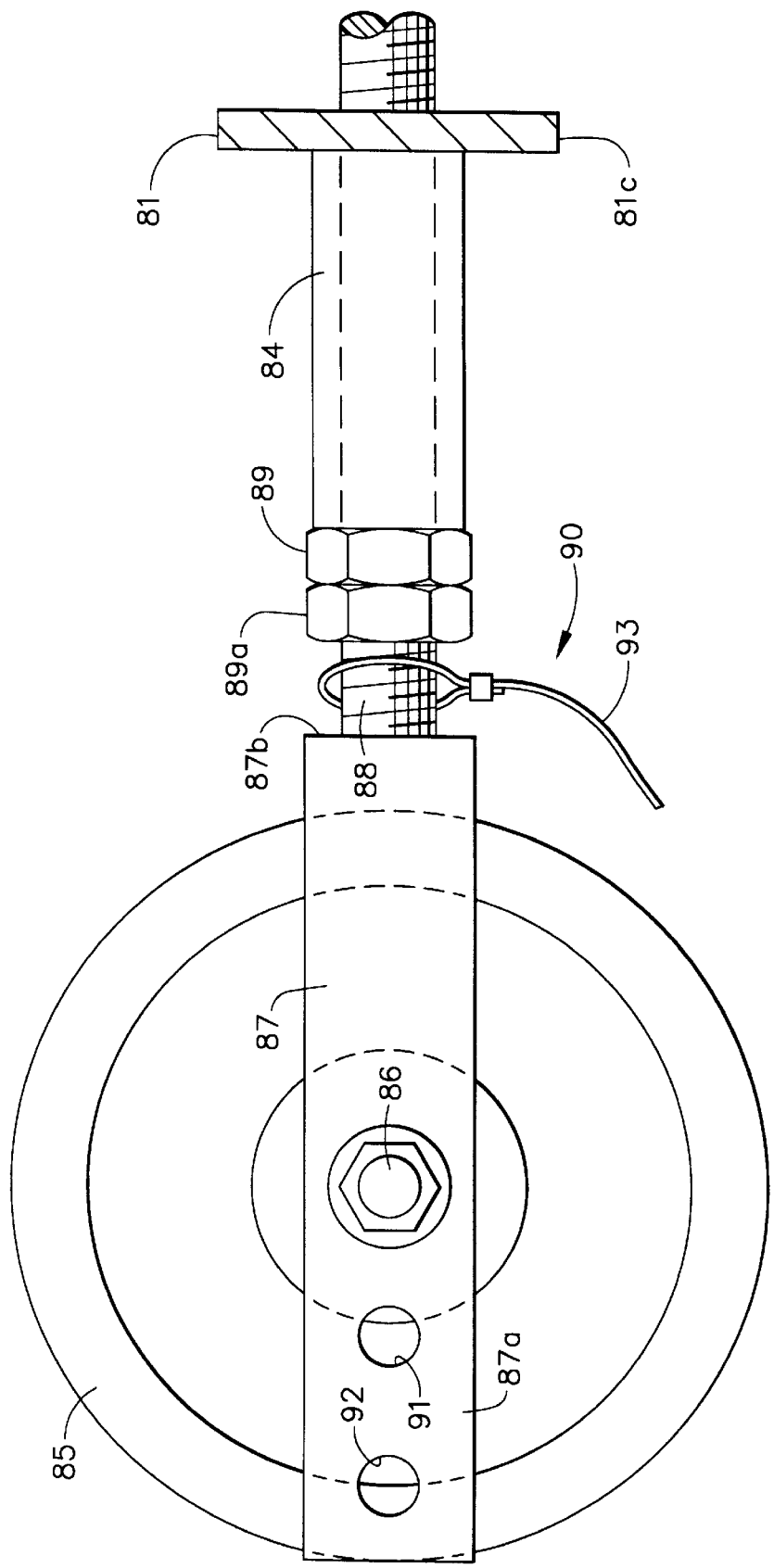
FIG. 16 is a side elevational view of an alternate take-up sheave assembly.

Bracket 81, tubular element 84, bracket 87, threaded rod 88 and sheave 85 are also shown in FIG. 16 and constitute a take-up assembly 90. In FIG. 16, the short shaft 86 of take-up idler sheave 85 is shown mounted in the first of three available holes in the long leg 87a of bracket 87. Two additional holes are shown at 91 and 92. If the adjustment nut 89 does not provide sufficient take-up, the take-up sheave shaft 86 may be repositioned in either of holes 91 and 92. This will increase the take-up capability of sheave 85.

The take-up sheave 85, its bracket 87 and the threaded rod 88 may be provided with a lanyard 93 by which it is captively attached to the adjacent conveyor frame element 75. Should the drive belt break, and the assembly of the take-up sheave 85, bracket 87 and threaded rod 88 be pulled from tubular element 84, the assembly will fall a predetermined distance (i.e. the length of the lanyard), preventing loss.

Figure 13:
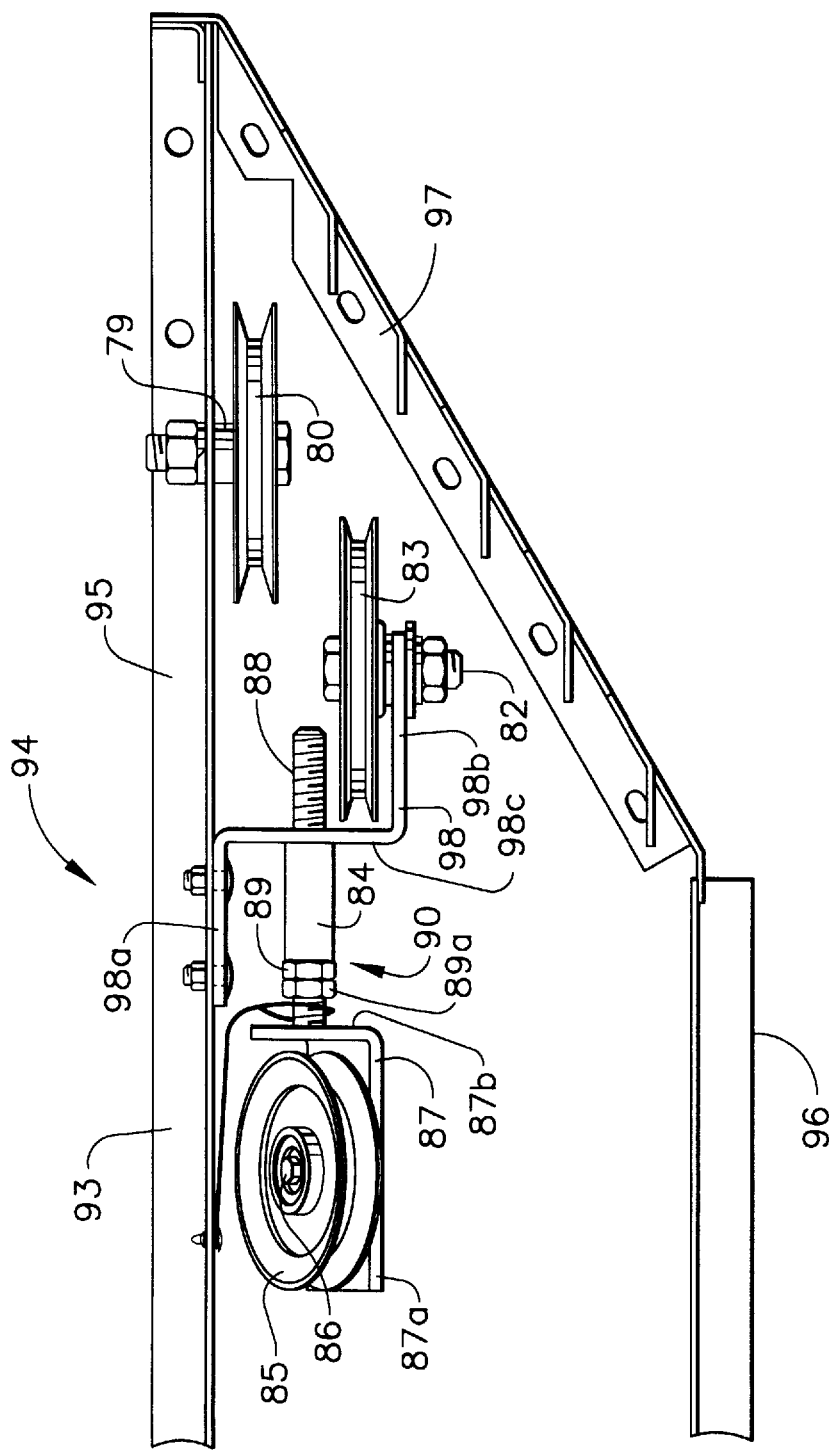

Reference is now made to FIG. 13 which illustrates an end portion of a rectilinear branch conveyor segment, generally indicated at 94. In this instance, conveyor segment is made up of rectilinear side frames 95 and 96 interconnected by frame element 97, similar to frame element 78 of FIG. 12, and adapted to be attached to the side of a main conveyor. The idler sheave adjacent to frame 95, the second idler sheave and the take-up sheave assembly are essentially identical to those of FIG. 12, and like parts have been given like index numerals. Thus, idler sheave 80 is attached by short shaft 79 to the side frame element 95. The primary difference between the structure of FIG. 13 and FIG. 12 (beyond the fact that conveyor branch segment 94 is rectilinear), lies in the shape of bracket 98 which supports idler sheave 83 and the take-up assembly 90. Bracket 98 is essentially Z-shaped, having a first leg portion 98a bolted to frame member 95 and a second leg portion 98b to which the short shaft 82 of idler sheave 83 is mounted. The legs 98a and 98b are joined by a web portion 98c which is substantially perpendicular to frame member 95. The take-up assembly is affixed to web portion 98c in the same manner described with respect to mounting of the take-up assembly to base portion 81c of FIG. 12.

Figure 14:
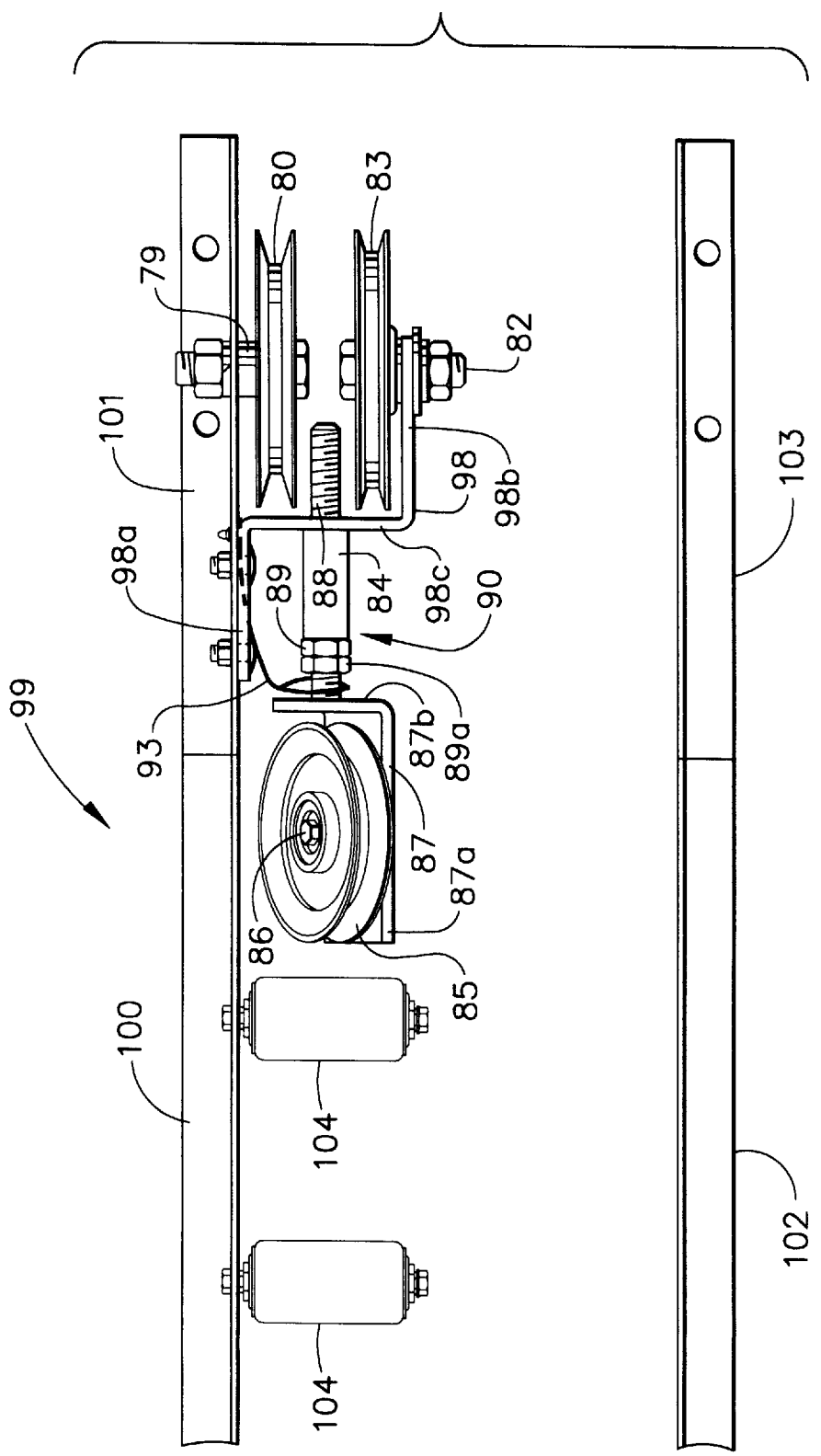

FIG. 14 is a simplified plan view of the idler end of a rectilinear conveyor generally indicated at 99. The conveyor frame is made up of frame elements 100 and 101 on one side and frame elements 102 and 103 on the other side. The two idler sheaves and the take-up sheave are identical to those illustrated in FIGS. 12 and 13, with the exception of placement. It will be noted that the embodiment of FIG. 14 uses the same bracket as the embodiment of FIG. 13. The various idler wheels, the take-up assembly and the bracket have been given like index numerals since they are identical to the corresponding elements of FIG. 13. In this instance, the idler wheel 80 is attached by its short shaft 79 to conveyor frame 101. The idler wheel 83 is attached by its short shaft 82 to the arm 98b of bracket 98. The arm 98a of the bracket is bolted to frame member 101. In the same manner described with respect to FIGS. 12 and 13, the entire take-up assembly 90 is attached to bracket web 98c in the same manner as it is attached to the bracket base 81c of FIG. 12. In FIG. 14, some additional short rolls 104 are shown. These rolls, when required, support the return flight of the drive belt. Idler wheels (not shown), like idler wheels 45 of FIGS. 8 and 9 support the upper flight of the drive belt and ensure that the drive belt frictionally engages the conveyor rollers.

Figure 15:
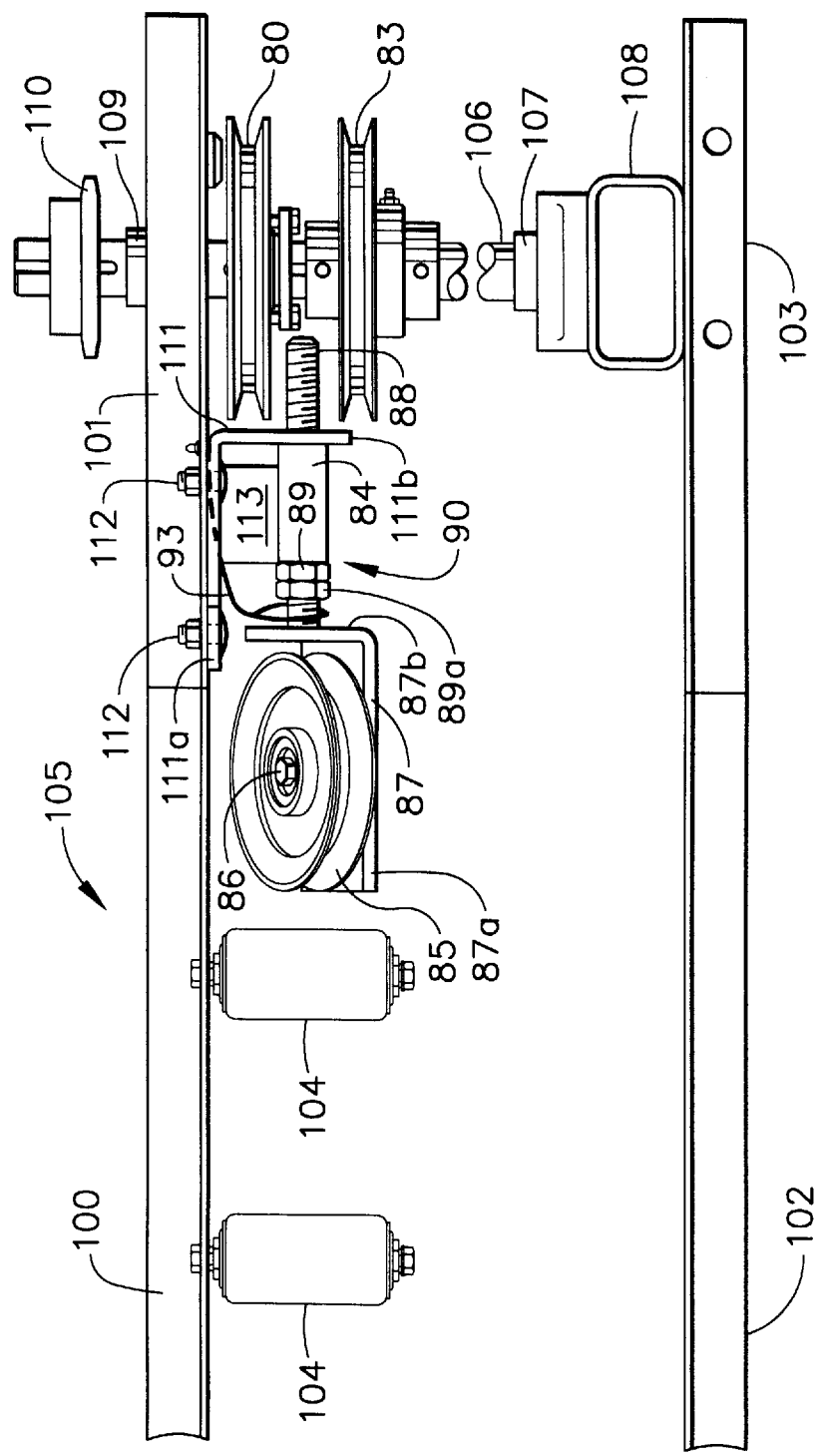

A final exemplary embodiment is illustrated in FIG. 15. FIG. 15 is a simplified plan view of the idler end of a rectilinear conveyor segment generally indicated at 105. The conveyor frame is identical to that of FIG. 14, and like frame members have been given like index numerals. A series of short rolls (two of which are shown) are identical to the rolls 104 of FIG. 14 and serve precisely the same purpose. Therefore, these rolls have been given like index numerals. Rolls 104 are present only if needed. Idler wheels (not shown) like idler wheels 45 of FIGS. 8 and 9 support the upper flight of the drive belt and ensure that the drive belt frictionally engages the conveyor rollers. The idler end of conveyor 105 again is provided with a pair of idler sheaves identical in purpose to idler sheaves 80 and 83, and they too have been given like index numerals. In this instance the idler sheaves 80 and 83 have been mounted on the same rotatable shaft 106. One end of shaft 106 is provided with an appropriate bearing 107 affixed to a frame member 108 which, itself, is attached to frame member 103. Rotatable shaft 106 passes through frame member 101 and is provided with an appropriate bearing 109 affixed thereto. The end of shaft 106 may be provided with a power take off sprocket 110. The sprocket 110 may be used to power the sheave 80; to power the driven drive belt sheave of the next adjacent conveyor segment; or to serve as a power take-off for other equipment. The take-up assembly 90 is identical to that shown in FIGS. 12, 13, 14 and 16, and like parts have been given like index numerals. In this instance, the take-up assembly is mounted on frame member 101 by its own bracket 111. The bracket 111 is L-shaped, having a long leg 111a and a short leg 111b. The long leg of 111a of bracket 111 is affixed to conveyor frame member 101 by bolts 112. The short leg 111b extends perpendicularly from conveyor frame member 101 and has mounted thereto the tubular element 84 of the take-up assembly 90, in the same manner described with respect to FIG. 12. A reinforcement web 113 may be affixed to and between bracket leg 111a and the tubular member 84 of the take-up assembly 90.

Modifications may be made in the invention without departing from the spirit of it. For example, FIGS. 3 and 4 show a single loop formed in the return flight of the drive belt similar to the loop formed by sheaves 26 and 27 in FIGS. 5 and 6. It will be understood that the single loop of FIGS. 3 and 4 could have been similar to the loop formed in FIGS. 5 and 6 by sheaves 24 and 25.

What is claimed:

1. A drive belt system for driving the rollers of a live roller conveyor segment comprising a pair of uniformly spaced, first and second side frames supporting said live rollers, said drive belt system, comprising an elongated continuous drive belt having at least one first surface, a first sheave mounted adjacent one end of said first side frame, a second sheave mounted adjacent the other end of said first side frame, a plurality rotatable idler supports mounted on and substantially evenly spaced along said first side frame between said first and second sheaves, said drive belt having an upper flight extending about and between said first and second sheaves and being supported by said rotatable idler supports and being maintained thereby in frictional engagement with said conveyor rollers to power said conveyor rollers, said drive belt having a lower flight extending between said first and second sheaves, a third sheave and a fourth sheave, said return flight passing thereabout to form a first approximately planar loop in said return flight, at least one of said third and fourth sheaves comprising an adjustable take up sheave, said drive belt contacting all of said sheaves with said at least one first surface.

2. The drive belt system claimed in claim 1 wherein any one of said first, second, third and fourth sheaves is a driven sheave, the remaining sheaves being idler sheaves.

3. The drive belt system claimed in claim 1 wherein one of said first and second sheaves is a driven sheave, the remaining sheaves being idler sheaves.

4. The drive belt system claimed in claim 1 wherein said drive belt is a V-belt.

5. The drive belt system claimed in claim 1 wherein said drive belt can be driven in either of two directions.

6. The drive belt system claimed in claim 1 wherein said lower drive belt flight extends from the lower periphery of said second sheave to the lower periphery of said third sheave, from the upper periphery of said third sheave to the upper periphery of said fourth sheave, and from the lower periphery of said fourth sheave to the lower periphery of said first sheave, said third sheave being spaced along said conveyor between said fourth sheave and said first sheave.

7. The drive belt system claimed in claim 6 wherein said third and first sheaves are coaxial.

8. The drive belt system claimed in claim 1 wherein said lower drive belt flight extends from the lower periphery of said second sheave to the lower periphery of said third sheave, from the upper periphery of said third sheave to the upper periphery of said fourth sheave, and from the lower periphery of said fourth sheave to the lower periphery of said first sheave, said fourth sheave being spaced along said conveyor between said second sheave and said third sheave.

9. The drive belt system claimed in claim 8 wherein said second and fourth sheaves are coaxial.

10. The drive belt system claimed in claim 1 including a fifth sheave and a sixth sheave, said return flight passing thereabout to form a second loop in said return flight.

11. The drive belt system claimed in claim 10 wherein said first and second loops each impart a 360° twist to said drive belt, said twists being in opposite directions whereby to effectively cancel each item.

12. The drive belt system claimed in claim 10 wherein at least one of said fifth and sixth sheaves comprise an adjustable take-up sheave.

13. The drive belt system claimed in claim 10 wherein any one of said first, second, third, fourth, fifth and sixth sheaves is a driven sheave, the remaining sheaves being idler sheaves.

14. The drive belt system claimed in claim 10 wherein one of said first and second sheaves is a driven sheave, the remainder of said sheaves being idler sheaves.

15. The drive belt system claimed in claim 10 wherein said drive belt is a V-belt.

16. The drive belt system claimed in claim 10 wherein said drive belt can be driven in either of two directions.

17. The drive belt system claimed in claim 10 wherein said lower drive belt flight extends from the lower periphery of said second sheave to the lower periphery of said third sheave, from the upper periphery of said third sheave to the upper periphery of said fourth sheave, from the lower periphery of said fourth sheave to the lower periphery of said fifth sheave, from the upper periphery of said fifth sheave to the upper periphery of said sixth sheave and from the lower periphery of said sixth sheave to the lower periphery of said first sheave, said fourth sheave being spaced along said conveyor segment between said second sheave and said third sheave, and said fifth sheave being spaced along said conveyor segment between said sixth sheave and said first sheave.

18. The drive belt system claimed in claim 17 wherein said second and fourth sheaves lie in parallel planes, said third sheave comprising a first adjustable take-up sheave and lying in a tilted plane between said parallel planes of said second and fourth sheaves, so that said belt more easily passes from said second sheave to said third sheave and from said third sheave to said fourth sheave, said fifth sheave and said first sheave lying in parallel planes, said sixth sheave comprising a second adjustable take-up sheave and lying in a tilted plane between said parallel planes of said fifth and first sheaves, so that said belt more easily passes from said fifth sheave to said sixth sheave and from said sixth sheave to said first sheave.

19. The drive belt system claimed in claim 18 wherein each of said first and second take-up sheaves are adjustable to any one of a range of desired take-up positions.

20. The drive belt system claimed in claim 18 wherein each of the first and second take-up sheaves are spring biased to any one of a range of desired take-up positions.

21. The drive belt system claimed in claim 18 wherein said conveyor segment is rectilinear, said first and second take-up sheaves being adjustable over predetermined distances in directions along the length of said conveyor segment.

22. The drive belt system claimed in claim 18 wherein said conveyor segment is curved, said first take-up sheave being shiftable over a predetermined distance along said conveyor in a plane parallel to and between said parallel planes of said second and fourth sheaves, said second take-up sheave being shiftable over a predetermined distance along said conveyor in a plane parallel to and between said parallel planes of said fifth and first sheaves.

23. The drive belt system claimed in claim 18 wherein each of said take-up sheaves is affixed to one end of a bar by a short shaft, a block is affixed to the other end of said bar, a bore in said block the axis of which is parallel to said bar, a threaded rod slidably extending through said block bore, one end of said threaded rod facing its respective take-up sheave and having a spring seat mounted thereon, a spring mounted on said rod between said block and said spring seat, a transverse brace attached at its ends to said first and second conveyor segment side frames, the other end of said threaded rod being operatively attached to said transverse brace by a spherical rod end, a pre-load nut facing said block and a lock nut therebehind being threadedly engaged on said threaded rod, said spring constantly urging said block toward said pre-load adjustment nut, said other end of said rod passing through said spherical rod end and being provided therebehind with a belt tension adjustment nut and a lock nut.

24. The drive belt system claimed in claim 18 wherein said second and fourth sheaves are coaxial and said fifth and first sheaves are coaxial.

25. The drive belt system claimed in claim 18 wherein each of said first and second take-up sheaves are mounted by a short shaft to the long leg of an L-shaped bracket having both a long leg and a short leg, a threaded rod being affixed to said short leg of said L-shaped bracket and extending perpendicularly to said short leg, a hollow tube having first and second ends, said threaded rod extending through said tube with a sliding fit, said first end of said tube facing said short leg of said L-shaped bracket, an adjustment nut and a lock nut threadedly engaged on said threaded rod between said first end of said tube and said short leg of said L-shaped bracket, said threaded rod being normally held in said tube at a depth determined by abutment of said adjustment nut against the first end of said tube to adjust the position of said take-up sheave.

26. The drive belt system claimed in claim 25 including a U-shaped bracket having first and second leg portions and a base portion, said first bracket leg portion being attached to said first conveyor segment side frame with said base portion perpendicular to said first side frame and said second leg portion parallel to said side frame, said second leg portion supporting a short shaft with one of said fourth and fifth sheaves thereon, said second end of said tube of one of said first and second take-up sheaves being affixed to said bracket base portion, said bracket base portion having a hole therethrough to slidably received the threaded rod of said take-up sheave.

27. The drive belt system claimed in claim 25 including a Z-shaped bracket, comprising oppositely directed first and second leg portions and a web portion therebetween and perpendicular thereto, said first bracket leg portion being attached to said first conveyor segment side frame with said web portion perpendicular to said first side frame and said second leg portion parallel thereto, said second leg portion supporting a short shaft with one of said fourth and fifth sheaves thereon, said second end of said tube of one of said first and second take-up sheaves being affixed to said bracket web portion, said bracket web portion having a hole therethrough to slidably receive said threaded rod of said take-up sheave.

28. The drive belt system claimed in claim 25 including an L-shaped bracket comprising a long leg portion and a short leg portion perpendicular thereto, said long leg portion being affixed to said conveyor segment first side frame with said short leg portion perpendicular to said front side frame, said second end of said tube of one of said first and second take-up sheaves being affixed to the short leg portion of said bracket, said short leg portion having a hole therethrough to slidably receive said threaded shaft of said take-up sheave.

\* \* \* \* \*